(12) United States Patent
Cheng et al.

(10) Patent No.: US 10,749,637 B2
(45) Date of Patent: Aug. 18, 2020

(54) METHODS AND DEVICES FOR APERIODIC UPLINK TRANSMISSION

(71) Applicant: FG Innovation Company Limited, Tuen Mun (CN)

(72) Inventors: Yu-Hsin Cheng, Hsinchu (TW); Chie-Ming Chou, Hsinchu (TW); Mei-Ju Shih, Hsinchu (TW); Yung-Lan Tseng, Hsinchu (TW); Hung-Chen Chen, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 19 days.

(21) Appl. No.: 16/252,437

(22) Filed: Jan. 18, 2019

(65) Prior Publication Data
US 2019/0222361 A1  Jul. 18, 2019

Related U.S. Application Data

(60) Provisional application No. 62/618,687, filed on Jan. 18, 2018.

(51) Int. Cl.
*H04L 1/18* (2006.01)
*H04L 27/00* (2006.01)
*H04L 1/06* (2006.01)
*H04L 25/02* (2006.01)
*H04L 5/00* (2006.01)

(52) U.S. Cl.
CPC .......... *H04L 1/1812* (2013.01); *H04L 1/0693* (2013.01); *H04L 5/0091* (2013.01); *H04L 25/0226* (2013.01); *H04L 27/0014* (2013.01); *H04L 5/0048* (2013.01); *H04L 5/0055* (2013.01); *H04L 2027/0018* (2013.01)

(58) Field of Classification Search
None
See application file for complete search history.

(56) References Cited

U.S. PATENT DOCUMENTS

| 2013/0148614 | A1* | 6/2013 | Noh | H04L 5/001 370/329 |
| 2013/0322302 | A1* | 12/2013 | Gholmieh | H04W 36/24 370/280 |
| 2014/0010182 | A1* | 1/2014 | Chunli | H04L 5/0048 370/329 |

(Continued)

*Primary Examiner* — Shripal K Khajuria
(74) *Attorney, Agent, or Firm* — ScienBiziP, P.C.

(57) ABSTRACT

A method for a user equipment (UE) is disclosed. The method includes receiving, by the UE, downlink control information (DCI) for a downlink (DL) scheduling assignment (DL-DCI), the DL-DCI indicating a first uplink (UL) carrier associated with a Physical Uplink Control Channel (PUCCH) resource configuration for transmitting an aperiodic UL transmission for uplink control information (UCI), and transmitting, by the UE, the aperiodic UL transmission for UCI in a second UL carrier without a PUCCH resource configuration, where the UE determines a resource allocation of the second UL carrier based on the DL-DCI. The DL-DCI includes at least one of: a UL/supplementary UL (SUL) carrier indicator, a Hybrid Automatic Repeat reQuest (HARQ)-ACK resource indicator (ARI), a sounding reference signal (SRS) request field, a HARQ timing indicator, or a channel station information (CSI) request.

16 Claims, 19 Drawing Sheets

(56) References Cited

U.S. PATENT DOCUMENTS

2014/0016475 A1* 1/2014 Zhou ................ H04W 72/1242
370/236
2017/0135090 A1* 5/2017 Yin ....................... H04L 1/1861
2018/0115430 A1* 4/2018 Seo ....................... H04L 1/0073

* cited by examiner

FIG. 3(a)

| RRC configured bitmap | Number of bits for transmitting pattern |
|---|---|
| 00 | 2 bits |
| 01 | 4 bits |
| 10 | 6 bits |
| 11 | 12 bits |

FIG. 3(b)

| Bitmap indicated by DL DCI | |
|---|---|
| 0000 | transmitting pattern #0 |
| 0001 | transmitting pattern #1 |
| ... | ... |
| 1111 | transmitting pattern #15 |

FIG. 3(c)

```
Transmitting-Pattern-Configuration::{
  Transmitting-Pattern :: SEQUENCE (SIZE(0,..., number of transmitting pattern-1)){
    - Starting OFDM symbol index
    - slot offset
    - Starting index of PRB
    ...
  }
  ...
}
```

FIG. 3(d)

```
Transmitting-Pattern-Configuration::{
  Transmitting-Pattern :: SEQUENCE (SIZE(0,..., number of transmitting pattern-1)){
    - Starting OFDM symbol index
    - Starting index of PRB
    ...
  }
  ...
}
```

Fig. 4

| Number of bits for transmitting pattern | DL DCI field for re-interpretation |
|---|---|
| 2 bits | ARI |
| 4 bits | ARI, SRS request |
| 6 bits | ARI, SRS request, HARQ timing indicator |
| 12 bits | ARI, SRS request, HARQ timing indicator, CSI request |

FIG. 5(a)

```
ServingCellConfigCommon ::= SEQUENCE {
  - frequencyInfoUL  SEQUENCE {
      - carrierFreqUL,
      - carrierBandwidthUL
  },
  - SupplementaryUplink  SEQUENCE {
      - frequencyInfoUL  SEQUENCE {
          - carrierFreqUL,
          - carrierBandwidthUL
      }
  }
}
```

FIG. 5(b)

```
ServingCellConfigDedicated ::= SEQUENCE {
  - PUCCHConfig  SEQUENCE {
      - PUCCH-Resourceset ::= {
          - PUCCH resource ::= {
              - startingSymbolIndex
              - numberofSymbols
              - startingPRB
          },
          ...
          - PUCCH resource ::= {
              ...
          }
      },
      ...
  }
}
```

FIG. 5(c)

```
ServingCellConfigDedicated ::= SEQUENCE {
  - PUSCHConfig  SEQUENCE {
      ...
  },
  - PUSCHConfig  SEQUENCE {
      ...
  }
}
```

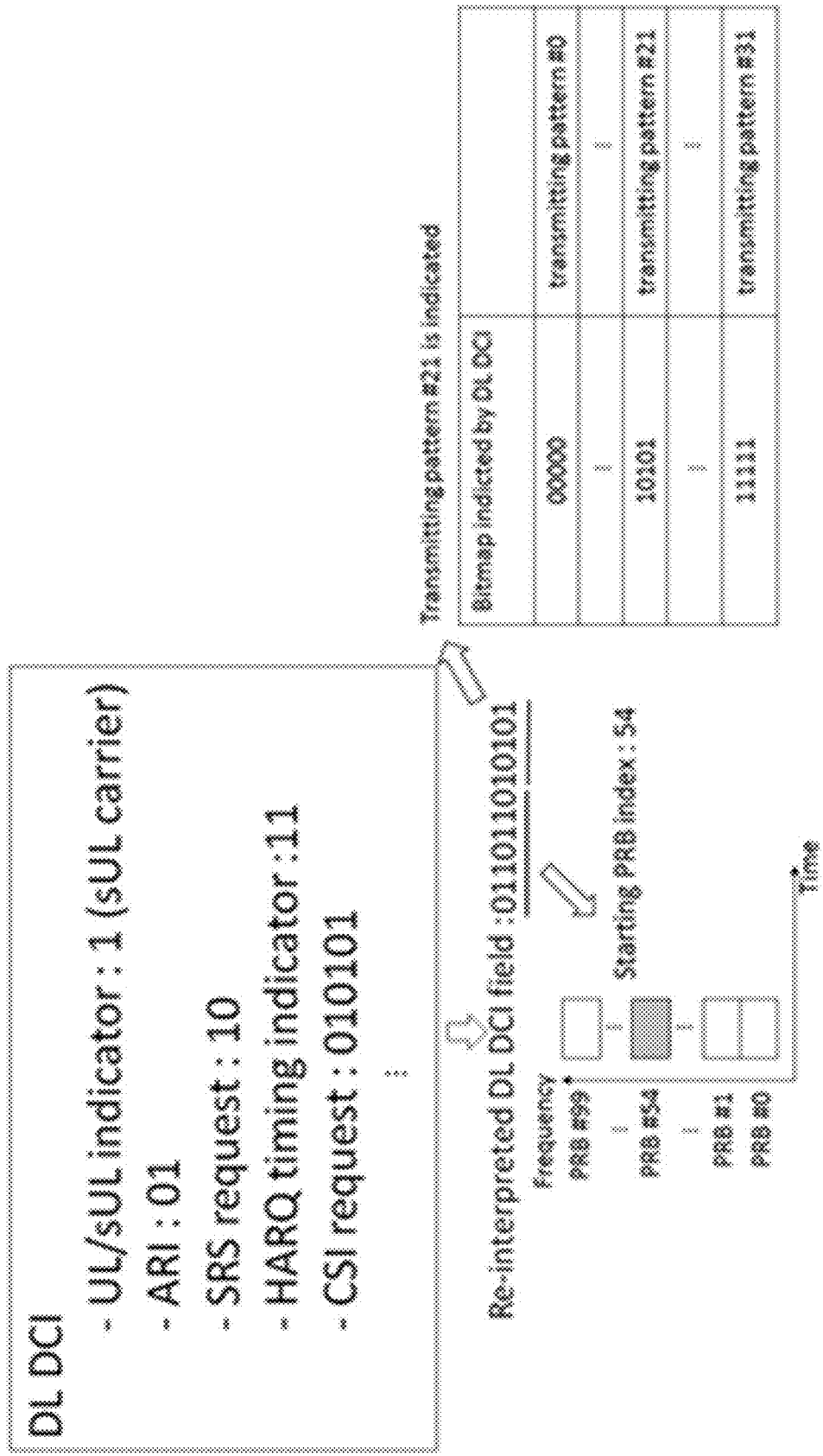

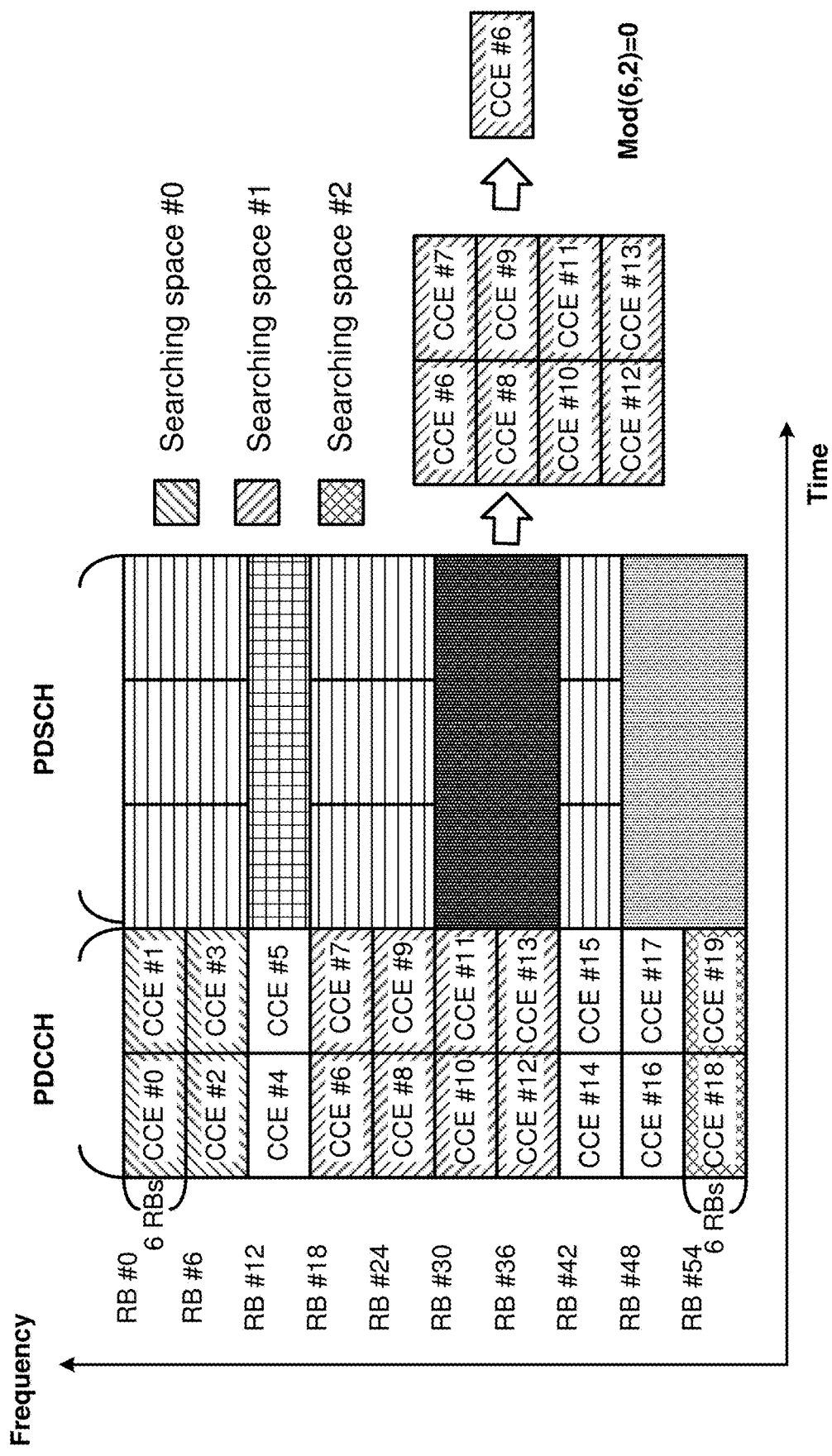

Fig. 12

```
ServingCellConfigDedicated ::= SEQUENCE {
    ...
    SRSConfig ::= SEQUENCE {
        - SRS-Resourceset ::= SEQUENCE{
            - SRS-Resourceset-ID
            - SRS-Resource-ID ::= SEQUENCE{
                ...
            }
        }
        - SRS-Resourceset ::= SEQUENCE{
            ...
        }
    }
    SRSConfig ::= SEQUENCE {
        - SRS-Resourceset ::= SEQUENCE{
            ...
        }
    }
    ...
}
```

```
- SRS-Resource ::= SEQUENCE {
    - SRS-Resource-ID
    - periodicityAndOffset
    - freqDomainPosition
    ...
}
```

| SRS request field | |
|---|---|
| 8 | No SRS trigger |
| 9 | The 1st SRS resource set(s) configured by higher layers |
| 10 | The 2nd SRS resource set(s) configured by higher layers |
| 11 | The 3rd SRS resource set(s) configured by higher layers |

Fig. 13

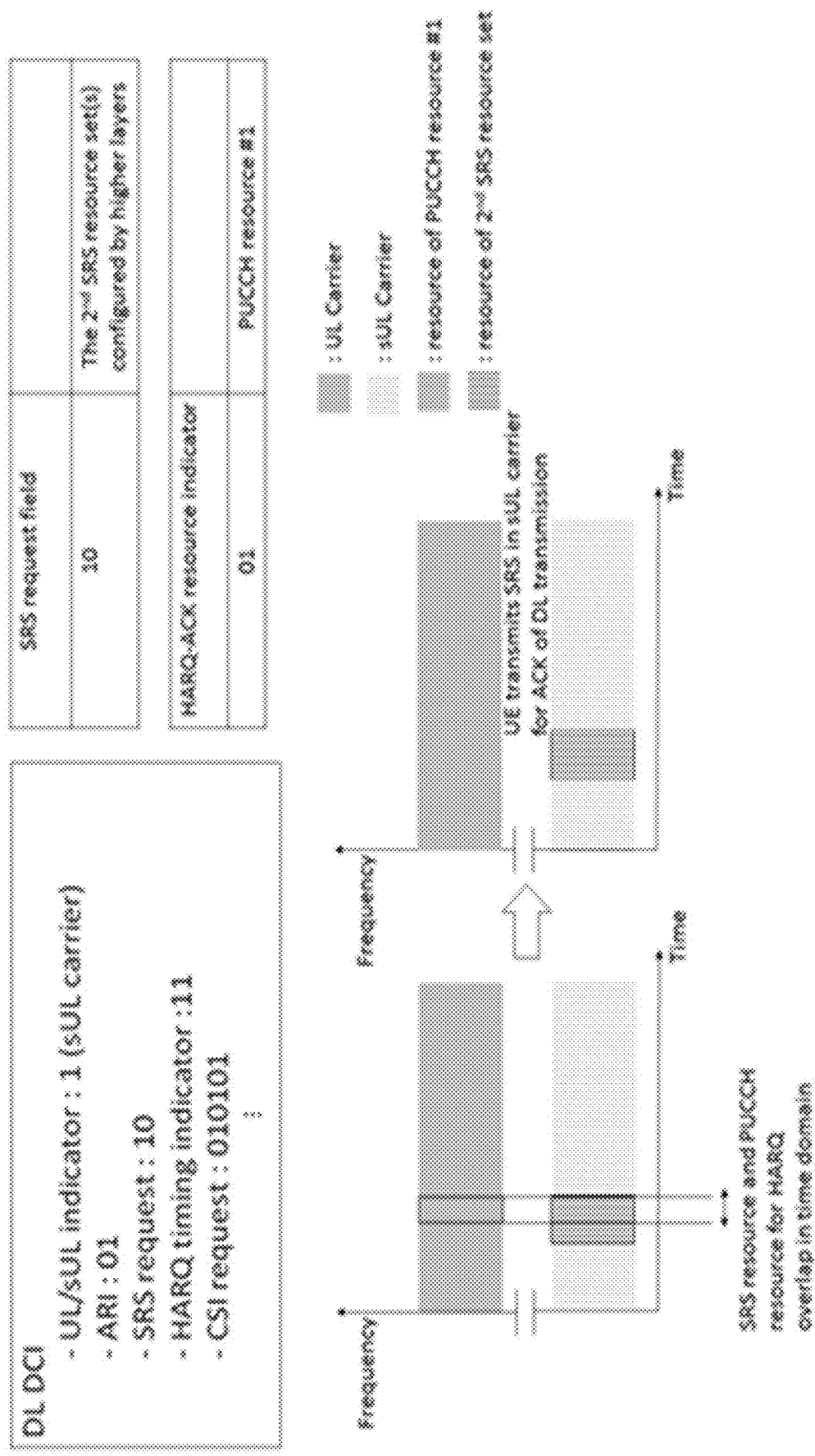

Fig. 15

1580 — Receive, by the UE, downlink control information (DCI) for a downlink (DL) scheduling assignment (DL-DCI), the DL-DCI indicating a first uplink (UL) carrier associated with a Physical Uplink Control Channel (PUCCH) resource configuration for transmitting an aperiodic UL transmission for uplink control information (UCI)

1582 — Transmit, by the UE, the aperiodic UL transmission for UCI in a second UL carrier without a PUCCH resource configuration, where the UE determines a resource allocation of the second UL carrier based on the DL-DCI (the DL-DCI includes at least one of: a UL/supplementary UL (SUL) carrier indicator, a Hybrid Automatic Repeat reQuest (HARQ)-ACK resource indicator (ARI), a sounding reference signal (SRS) request field, a HARQ timing indicator, a channel station information (CSI) request, or a control channel element (CCE) index)

1500

METHODS AND DEVICES FOR APERIODIC UPLINK TRANSMISSION

CROSS-REFERENCE TO RELATED APPLICATION(S)

The present application claims the benefit of and priority to a provisional U.S. Patent Application Ser. No. 62/618,687 filed on Jan. 18, 2018 entitled "Method and Apparatus for Aperiodic Uplink Transmission in Supplemental uplink component carrier."

FIELD

The present disclosure generally relates to wireless communications, and more particularly, to using a supplementary uplink (SUL) component carrier for uplink communications.

BACKGROUND

The 3rd Generation Partnership Project (3GPP) has been discussing the use of a supplementary uplink in addition to a primary uplink in a cell to improve coverage and performance in uplink direction for the next generation (e.g., $5^{th}$ Generation New Radio (5G NR)) wireless communication networks. Meanwhile, restrictions have been placed on resource allocation for the uplink control channel with regard to the supplemental uplink component carriers to avoid additional overhead that would otherwise incur when a UE occupies an uplink control channel resource without any uplink transmission. However, certain urgent services may be affected by these restrictions as a result of the increased latency.

Thus, there is a need in the art for new techniques that can enable a UE to transmit uplink control information without a configuration of control channel resources.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIG. 3(a) is a diagram illustrating an example of table configured from BS about the number of bits for resource allocation of aperiodic UL transmission for UCI, in accordance with an example implementation of the present application.

FIG. 3(b) is a diagram illustrating an example of time and frequency transmitting patterns when 4 bits is used for resource allocation of aperiodic UL transmission for UCI, in accordance with an example implementation of the present application.

FIG. 3(c) is a diagram illustrating an example of a configuration of transmitting pattern with slot offset, in accordance with an example implementation of the present application.

FIG. 3(d) is a diagram illustrating an example of a configuration of transmitting pattern without slot offset, in accordance with an example implementation of the present application.

FIG. 4 is a diagram illustrating an example of a default relationship between number of bits for resource allocation of aperiodic UL transmission for UCI and the re-interpreted DL DCI fields, in accordance with an example implementation of the present application.

FIG. 5(a) is a diagram illustrating an example of ServingCellConfigCommon which supports UL and SUL carrier, in accordance with an example implementation of the present application.

FIG. 5(b) is a diagram illustrating an example of ServingCellConfigDedicated for PUCCH configuration, in accordance with an example implementation of the present application.

FIG. 5(c) is a diagram illustrating an example of ServingCellConfigDedicated for PUSCH configuration, in accordance with an example implementation of the present application.

FIG. 10(b) is a diagram illustrating an example of a relationship between ARI field, HARQ timing index, CSI request field, SRS request field and transmitting pattern with explicit frequency domain resource assignment, in accordance with an example implementation of the present application.

FIG. 11(a) is a diagram illustrating an example of CCE index for an additional bit, in accordance with an example implementation of the present application.

FIG. 12 is a diagram illustrating an example of an SRS configuration for UL carrier and SUL carrier, in accordance with an example implementation of the present application.

FIG. 13 is a diagram illustrating an example of a relationship between SRS request field and SRS resource set, in accordance with an example implementation of the present application.

FIG. 14 is a diagram illustrating an example of a UE response ACK for DL transmission by SRS transmission in a UL carrier, in accordance with an example implementation of the present application.

FIG. 15 illustrates a flowchart of a method by a UE for transmitting an aperiodic UL transmission for UCI, in accordance with an example implementation of the present application.

SUMMARY

Figure 1:
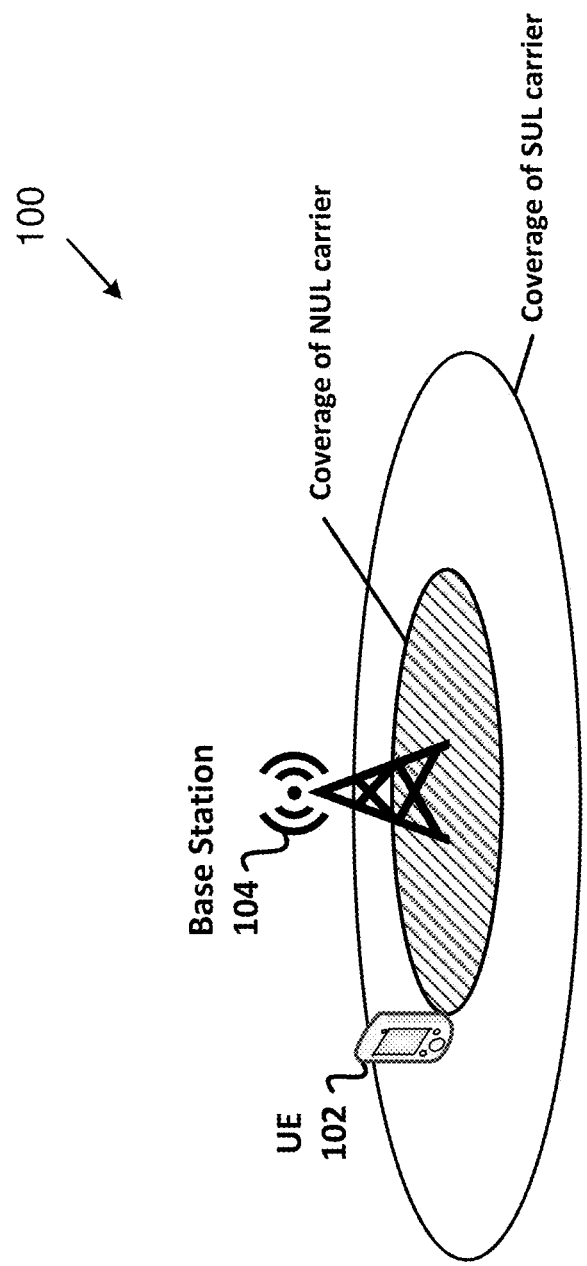
FIG. 1 is a diagram illustrating a cell with UL and SUL CC deployment, in accordance with an example implementation of the present application.

The present disclosure is directed to methods and devices for aperiodic uplink transmission.

In a first aspect of the present disclosure, a method for a user equipment (UE) is disclosed, the method comprising: receiving, by the UE, downlink control information (DCI) for a downlink (DL) scheduling assignment (DL-DCI), the DL-DCI indicating a first uplink (UL) carrier associated with a Physical Uplink Control Channel (PUCCH) resource configuration for transmitting an aperiodic UL transmission for uplink control information (UCI); transmitting, by the UE, the aperiodic UL transmission for UCI in a second UL carrier without a PUCCH resource configuration; wherein the UE determines a resource allocation of the second UL carrier based on the DL-DCI.

In an implementation of the first aspect, the DL-DCI includes at least one of: a UL/supplementary UL (SUL) carrier indicator; a Hybrid Automatic Repeat reQuest (HARQ)-ACK resource indicator (ARI); a sounding reference signal (SRS) request field; a HARQ timing indicator; or a channel station information (CSI) request.

In another implementation of the first aspect, the UL/SUL carrier indicator includes at least one bit for indicating on which one of a UL carrier and a SUL carrier the UE is to perform the aperiodic UL transmission for UCI.

In yet another implementation of the first aspect, the ARI indicates one of a plurality of PUCCH resource configurations for transmitting the aperiodic UL transmission for UCI.

In yet another implementation of the first aspect, the DL-DCI further includes a control channel element (CCE) index, together with the ARI, for indicating the one of the plurality of PUCCH resource configurations for transmitting the aperiodic UL transmission for UCI.

In yet another implementation of the first aspect, when the UL/SUL carrier indicator indicates using an SUL carrier for transmitting the aperiodic UL transmission for UCI, and the SUL is not configured with a PUCCH resource, the UE is configured to re-interpret the DL-DCI to determine a transmitting pattern for the aperiodic UL transmission for UCI.

In yet another implementation of the first aspect, the aperiodic UL transmission for UCI includes a HARQ message.

In yet another implementation of the first aspect, the configured PUCCH is configured through radio resource control (RRC) signaling.

In a second aspect of the present disclosure, a user equipment (UE) is disclosed, the UE comprising: one or more non-transitory computer-readable media having computer-executable instructions embodied thereon; at least one processor coupled to the one or more non-transitory computer-readable media, and configured to execute the computer-executable instructions to: receive downlink control information (DCI) for a downlink (DL) scheduling assignment (DL-DCI), the DL-DCI indicating a first uplink (UL) carrier associated with a Physical Uplink Control Channel (PUCCH) resource configuration for transmitting an aperiodic UL transmission for uplink control information (UCI); transmit the aperiodic UL transmission for UCI in a second UL carrier without a PUCCH resource configuration; wherein the UE determines a resource allocation of the second UL carrier based on the DL-DCI.

In an implementation of the second aspect, the DL-DCI includes at least one of: a UL/supplementary UL (SUL) carrier indicator; a Hybrid Automatic Repeat reQuest (HARQ)-ACK resource indicator (ARI); a sounding reference signal (SRS) request field; a HARQ timing indicator; or a channel station information (CSI) request.

In another implementation of the second aspect, the UL/SUL carrier indicator includes at least one bit for indicating on which one of a UL carrier and a SUL carrier the UE is to perform the aperiodic UL transmission for UCI.

In yet another implementation of the second aspect, the ARI indicates one of a plurality of PUCCH resource configurations for transmitting the aperiodic UL transmission for UCI.

In yet another implementation of the second aspect, the DL-DCI further includes a control channel element (CCE) index, together with the ARI, for indicating the one of the plurality of PUCCH resource configurations for transmitting the aperiodic UL transmission for UCI.

In yet another implementation of the second aspect, when the UL/SUL carrier indicator indicates using an SUL carrier for transmitting the aperiodic UL transmission for UCI, and the SUL is not configured with a PUCCH resource, the UE is configured to re-interpret the DL-DCI to determine a transmitting pattern for the aperiodic UL transmission for UCI.

In yet another implementation of the second aspect, the aperiodic UL transmission for UCI includes a HARQ message.

In yet another implementation of the second aspect, the configured PUCCH is configured through radio resource control (RRC) signaling.

DETAILED DESCRIPTION

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

The term "and/or" herein is only an association relationship for describing associated objects, and represents that three relationships may exist, for example, A and/or B may represent that: A exists alone, A and B exist at the same time, and B exists alone. In addition, the character "/" used herein generally represents that the former and latter associated objects are in an "or" relationship.

Furthermore, combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD-ROM), magnetic cassettes, magnetic tape, magnetic disk storage, or any other equivalent medium capable of storing computer-readable instructions.

A radio communication network architecture (e.g., a long term evolution (LTE) system, a LTE-Advanced (LTE-A) system, a LTE-Advanced Pro system, or a 5G New Radio (NR) Radio Access Network) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a 5G Core (5GC), or an internet), through a radio access network (RAN) established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the UMTS, an evolved node B (eNB) as in the LTE-A, a radio network controller (RNC) as in the UMTS, a base station controller (BSC) as in the GSM/GERAN, a ng-eNB as in an E-UTRA base station in connection with the 5GC, a next generation node B (gNB) as in the 5G-RAN, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, eLTE (evolved LTE), New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC), while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in a NR frame to support ProSe services or V2X services.

A supplemental uplink component carrier may be used to support a deployment in which an NR UL is allocated in a lower frequency band, for example, assigned to LTE networks, and an NR DL is allocated in a higher frequency band dedicated for NR networks. For example, an NR-LTE coexistence may be achieved by configuring a lower frequency band as a supplemental uplink (SUL) carrier and a higher frequency band as ordinary/normal uplink (UL) carrier to a UE at the same time, and a base station may configure which carrier is to be used for UL transmission. 3GPP has discussed some band combinations for this type of NR-LTE coexistence deployment for 5G such as 1710-1785 MHz (SUL) and 3.3-4.2 GHz (UL). Amount other benefits, the NR-LTE coexistence deployment may achieve better NR UL coverage in lower frequency bands than in higher frequency bands, and improve efficiency of resource utilization in LTE-FDD band in case LTE UL has a lower traffic load than LTE DL does.

Unlike PUSCH resources which can be configured by a base station in both SUL and UL component carriers, PUCCH resources can be configured in only one of the SUL and UL component carriers to avoid the overhead of additional reserved PUCCH resources. Thus, the base station has to perform an RRC reconfiguration process to change the radio frequency of the PUCCH resource, (e.g., reconfiguring the radio frequency band location of the PUCCH resource from SUL component carrier to UL component carrier and vice versa). Because RRC reconfiguration may introduce lots of latency, requirements of certain urgent services (e.g., URLLC service) may not be satisfied due to the restriction of PUCCH resource reconfiguration, for example, when a UE is on the cell edge of a UL component carrier.

FIG. 1 is a diagram illustrating a cell with UL and SUL CC deployment, according to an exemplary implementation of the present application. In FIG. 1, diagram 100 includes UE 102 and base station 104. As shown in FIG. 1, the coverage of a UL component carrier is different from that of an SUL component carrier. Thus, base station 104 may need to reconfigure PUCCH resources when base station 104 recognizes that UE 102 is on the cell edge of the UL component carrier by monitoring, for example, sounding reference signals (SRSs). Moreover, aperiodic UL transmission of uplink control information (UCI), which is triggered by downlink control information (DCI), such as a HARQ-ACK or CSI report may not be transmitted using an SUL component carrier until a PUCCH reconfiguration complete. To avoid latency caused by PUCCH reconfiguration and fulfill the requirement of URLLC service, implementations of the present application include methods for aperiodic UL transmission, where the methods support dynamic indication (e.g., L1 indication) of resource allocation for UCI transmission in SUL component carriers without RRC reconfiguration.

Since a PUSCH may support aperiodic transmission inherently by an indicator (e.g., 0 indicating a scheduled PUSCH to be transmitted in a UL component carrier and 1 indicating a scheduled PUSCH being transmitted in an SUL component carrier) contained in UL DCI, implementations of the present application include mechanisms aperiodic UL transmission for UCI and aperiodic SRS transmission. It should be noted that in some implementations of the present application, a UL component carrier may refer to a normal/regular/primary uplink component carrier in an NR UL band defined by the 3GPP. In some implementations, an SUL component carrier may refer to an uplink component carrier in an SUL band defined by the 3GPP. It should also be noted that although UL and SUL component carriers are described in FIG. 1 and various other figures, implementations of the present application may be carried out in general by a first uplink component carrier and a second uplink component carrier different from the first uplink component carrier uplink resources in the frequency domain.

Figure 2:
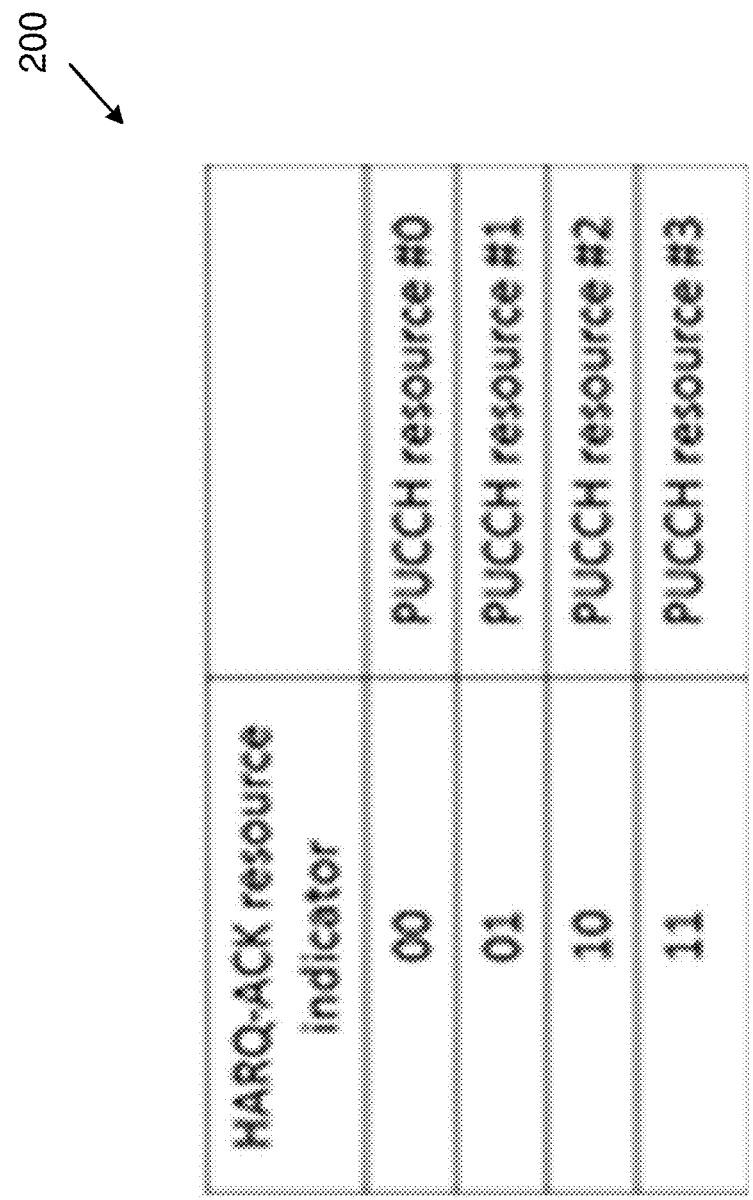
FIG. 2 is a diagram illustrating an ARI field for indicating different PUCCH resources configured by a base station, in accordance with an example implementation of the present application.

To transmit aperiodic UL transmission, such as a HARQ-ACK of DL transmission, in a wireless network where a corresponding PUCCH configuration is assigned, a UE may select a PUCCH resource based on a HARQ-ACK resource indicator (ARI) contained in DL DCI. As shown in diagram 200 of FIG. 2, an ARI field may comprise 2 bits for indicating different PUCCH resources configured by a base station. In some implementations, the ARI field may comprise more than 2 (e.g., 3) bits for indicating different PUCCH resources configured by the base station. In some implementations, when an RRC configuration contains more than 4 PUCCH resource configurations for a UE, the UE may further combine the CCE index after the UE successfully decodes the DL DCI with the ARI to obtain the PUCCH resource for transmitting the HARQ-ACK. In some implementations, when no PUCCH resource is configured for SUL component carrier, mechanisms and information to support aperiodic UL transmission may be indicated by DL DCI. It is noted that DL DCI is DCI for DL scheduling assignment, and UL DCI is DCI for UL scheduling assignment.

To support aperiodic UL transmission of UCI in a network without a PUCCH configuration (e.g., switching from UL coverage to SUL coverage), certain information may be necessary.

For example, a dynamic L1 indication, similar to the SUL/UL indicator, may be necessary in the UL DCI to indicate which carrier(s) may be used to transmit the aperiodic UL transmission. The base station may transmit an explicit bit in the DL DCI to indicate in which UL component carrier (e.g., UL or SUL) the UE may transmit the HARQ-ACK to the base station. It should be noted that because this explicit bit can be used for both SRS transmission and triggering aperiodic UL transmission for UCI in the SUL component carrier, additional information in the DL DCI field is needed implicitly or explicitly for the UE to distinguish the usage of the SUL/UL indicator (e.g., for SRS transmission or for transmitting a HARQ-ACK of DL transmission in the SUL component carrier. In one implementation, when the SUL/UL indicator indicates "SUL component carrier" as the SRS request field with a status of "NO SRS trigger", the UE may transmit the HARQ-ACK of DL transmission in the SUL component carrier. Otherwise, if the SRS request field indicates configured SRS resource sets, the UE may transmit the indicated SRS resource set in the SUL component carrier. In another implementation, when the SUL/UL indicator indicates "SUL component carrier" as the SRS resource set triggered by an SRS request overlaps the PUCCH resource in the UL component carrier indicated by the ARI in time domain (e.g., one or more OFDM symbols overlap), the UE may transmit the HARQ-ACK of DL transmission in the SUL component carrier. Otherwise, if the SRS resource set triggered by the SRS request does not overlap the PUCCH resource in the UL component carrier indicated by the ARI in time domain, the UE may transmit the indicated SRS resource set in the SUL component carrier.

In addition to the dynamic L1 indication discussed above, a dynamic L1 resource allocation for aperiodic UL transmission for UCI may also be necessary to support aperiodic UL transmission of UCI in the network without a PUCCH configuration. A UE may obtain PUCCH format information in addition to the resource allocation, where the PUCCH format information may include a starting OFDM symbol, a number of OFDM symbols in a slot, and a starting PRB index from PUCCH configuration. Thus, similar information can be allocated for aperiodic UL transmission. When the size of the DL DCI is limited, re-interpretation of current DL DCI may be needed for more flexible UL transmission resource allocation. The base station may pre-configure to the UE with regard to how many bits the UE will obtain by re-interpreting some DCI field. The configuration from the base station to the UE is about the number of bits for aperiodic UL transmission for UCI and/or the rules on how to re-interpret the DL DCI field. The base station may further configure to the UE a table containing time and frequency transmitting patterns during RRC connection establishment. As shown in FIGS. 3(a), 3(b), 3(c) and 3(d), transmitting patterns are configured by a base station, and may comprise time and frequency resource allocation, such as a starting OFDM symbol, a time slot offset, and a starting PRB index. It should be noted that the number of entries of the table may be the same as the number of bits for aperiodic UL transmission for UCI configured by the base station. It should be noted that the transmitting pattern may be used for one-shot aperiodic UL transmission for UCI, and it is unlike PUCCH resource which is reserved for the UE once the base station provided the PUCCH configuration upon the corresponding UL/SUL. It is noted that one-shot aperiodic UL transmission means that the transmitting pattern can only be applied for one time, and the UE may need to receive another transmitting pattern for the next aperiodic UL transmission. In some implementations, the transmission pattern may comprise repeated resources in which they have identical frequency domain allocation. Meanwhile, according to different number of bits for aperiodically associated resource allocation, different DCI fields may be used for resource allocation of aperiodic UL transmission for UCI. In one implementation, if only 3 bits are used for aperiodic UL transmission for UCI, the ARI field may be needed for reinterpretation. If more than 3 bits are used, other fields of the DL DCI may be needed for reinterpretation. The candidates of the DL DCI fields for re-interpretation may include the SRS request field, the HARQ timing indication field and the CSI request field. It is noted that if the HARQ timing indication is not re-interpreted, the UE may follow the slot offset indicated by the HARQ timing indication. On the other hand, if the HARQ timing indication is re-interpreted, the UE may follow the slot offset indicated in the transmitting pattern configuration or follow a default slot offset when there is no slot offset contained in the transmitting pattern configuration.

In addition to the DL DCI fields, the index of CCE in which the UE successfully decodes the DL DCI may also be used for indicating the transmitting pattern. The relationship between which DL DCI fields to be re-interpreted and the number of bits may be defined as a default value in the specification or the base station may configure the rules through RRC signaling. FIG. 4 is an example of relationship between number of bits for aperiodic UL transmission for UCI and the re-interpreted DL DCI fields. In another example, the number of bits for resource allocation of an aperiodic UL transmission for UCI may be fixed in the specification. In such a case, the base station may not need to configure to the UE the number of bits for resource allocation of the aperiodic UL transmission for UCI.

In another approach for aperiodic UCI transmission (e.g., a HARQ-ACK), a UE may indicate HARQ-ACK information by SRS transmission. When the SRS request field and the SUL/UL carrier indicator in the DL DCI trigger an SRS transmission in SUL component carrier, not transmitting the SRS in the SUL component carrier may be regarded as a NACK of the DL transmission, while transmitting the SRS in the SUL component carrier may be regarded as an ACK of the DL transmission. In order to avoid ambiguity, the base station may enforce this approach by selecting resources other than those allocated for transmitting periodic/semi-persistent SRS. In another implementation, transmitting SRS in a UL component carrier instead of a SUL component carrier may be regarded as a NACK of the DL transmission. It should be noted that the UE may be implicitly indicated to use an SRS transmission to replace a HARQ-ACK transmission if the time domain resource of the HARQ-ACK transmission of the UL component carrier indicated by the base station overlaps with the time domain resource of the SRS transmission indicated by the base station.

Implementation 1-1: ARI for Aperiodic Resource Allocation of UL Transmission for UCI In implementation 1-1, a base station may configure a cell, that is capable of UL transmission using an SUL component carrier via ServingCellConfig and/or ServingCellConfigCommon of RRC signaling. If a UE establishes a link with this cell, the UE may receive a PUSCH configuration and a PUCCH configuration via ServingCellConfig of RRC signaling. The PUSCH configuration may contain both PUSCH settings of an SUL component carrier and a UL component carrier, whereas the PUCCH configuration may contain one setting of either a UL component carrier or an SUL component carrier, depending on the base station. The examples of RRC signaling of PUCCH and PUSCH configurations for UL component carrier and SUL component carrier are shown in FIGS. 5(a), 5(b), and 5(c). It should be noted that the order of the PUSCH configuration in the RRC signaling may correspond to the PUSCH setting of the UL component carrier or SUL component carrier. For example, the first PUSCH configuration is for the UL component carrier and the second PUSCH configuration is for the SUL component carrier. In another example, when there is only one PUSCH configuration, the PUSCH configuration may be in the same UL or SUL component carrier as the PUCCH configured by the base station.

Next, the base station may configure PUCCH resource in the UL component carrier for the UE when the channel quality is good enough for UL transmission in the UL component carrier. Meanwhile, the base station may configure for the UE a table of time and frequency transmitting pattern for resource allocation of an aperiodic UL transmission for UCI. It is noted that the transmitting pattern configuration is contained in the PUSCH configuration of the SUL component carrier. In the present implementation, the number of bits for transmitting pattern may be 2, and the number of bits and which DL DCI fields are needed to be re-interpreted are defined as a default rule in the specification (e.g., 2 bits of ARI will be re-interpreted). It is noted that in other implementations, the base station may configure how many bits and which DL DCI fields are needed to be re-interpreted via RRC signaling. When the base station finds that the quality of UL signals becomes worse (e.g., lower than a predefined threshold), the base station may indicate to the UE to use the SUL component carrier for UL transmission. However, the UE may not have any PUCCH configuration of the SUL component carrier. Hence, the base station may use the DL DCI to indicate resource for UCI transmission after the RRC reconfiguration is complete.

Figure 6:
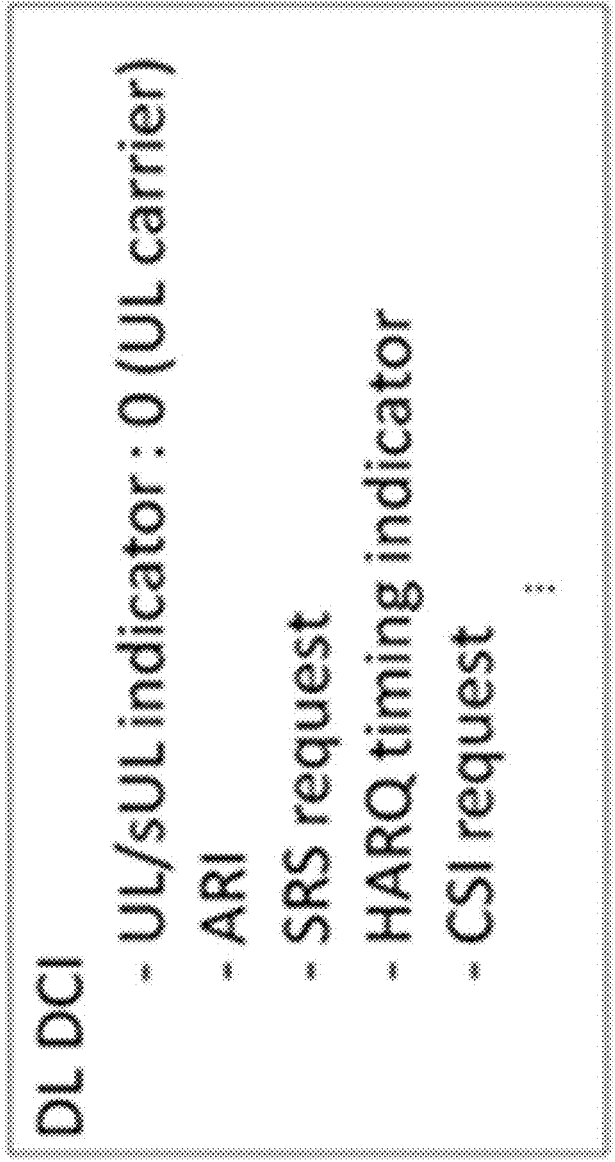
FIG. 6 is a diagram illustrating an example of DL DCI with explicit field for UL transmission, in accordance with an example implementation of the present application.

The DL DCI may contain a bit to explicitly indicate which carrier is to be used for UL transmission (e.g., "0" indicating to transmit the HARQ-ACK in the UL component carrier and "1" indicating to transmit the HARQ-ACK in the SUL component carrier). FIG. 6 shows an example of a DL DCI field for indicating which of the UL or SUL component carrier is to be used for UL transmission.

Figure 7:
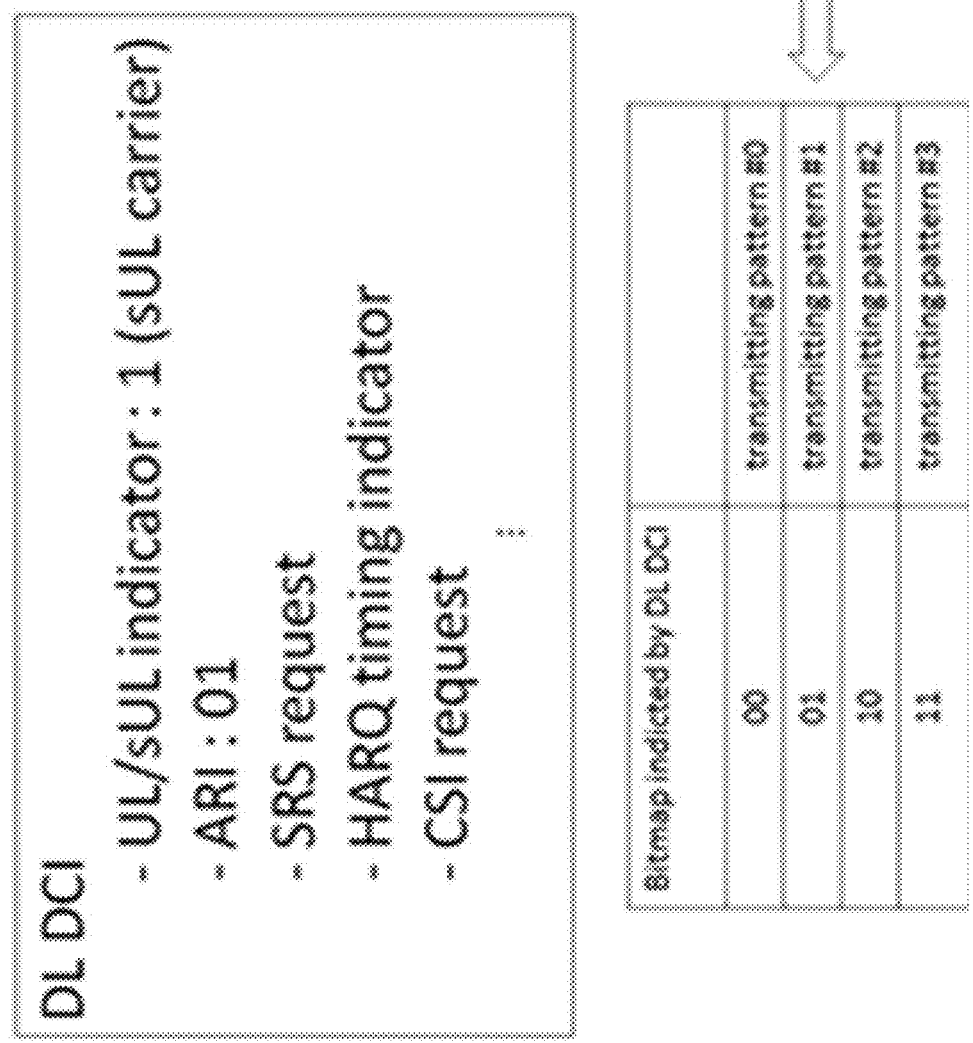
FIG. 7 shows an exemplary relationship between an ARI field and a transmitting pattern, in accordance with an example implementation of the present application.

If the DL DCI indicates that UL transmission is in the SUL component carrier, and the UE is only configured with PUCCH resource in the UL component carrier by the base station, then the UE may re-interpret the 2-bit ARI field based on default rules in the specification. FIG. 7 shows an exemplary relationship between an ARI field and a transmitting pattern, according to an implementation of the present application.

After the UE obtains the transmitting pattern, the UE may send uplink control information (e.g., HARQ-ACK) in the resource indicated by the transmitting pattern.

Implementation 1-2: SRS Request and ARI for Aperiodic Resource Allocation of UL Transmission for UCI In implementation 1-2, a base station may configure a cell, that is capable of UL transmission using an SUL component carrier via ServingCellConfig and/or ServingCellConfigCommon of RRC signaling. If a UE establishes a link with this cell, the UE may receive a PUSCH configuration and a PUCCH configuration via ServingCellConfig of RRC signaling. The PUSCH configuration may contain both PUSCH settings of an SUL component carrier and a UL component carrier, whereas the PUCCH configuration may contain one setting of either a UL component carrier or an SUL component carrier, depending on the base station. The examples of RRC signaling of PUCCH and PUSCH configurations for UL component carrier and SUL component carrier are shown in FIGS. 5(a), 5(b), and 5(c). It should be noted that the order of the PUSCH configuration in the RRC signaling may correspond to the PUSCH setting of the UL component carrier or SUL component carrier. For example, the first PUSCH configuration is for the UL component carrier and the second PUSCH configuration is for the SUL component carrier. In another example, when there is only one PUSCH configuration, the PUSCH configuration may be in the same UL or SUL component carrier as the PUCCH configured by the base station.

Next, the base station may configure PUCCH resource in the UL component carrier for the UE when the channel quality is good enough for UL transmission in the UL component carrier. Meanwhile, the base station may configure for the UE a table of time and frequency transmitting pattern for resource allocation of an aperiodic UL transmission for UCI. It is noted that the transmitting pattern configuration is contained in the PUSCH configuration of the SUL component carrier. In the present implementation, the number of bits for transmitting pattern may be 2, and the number of bits and which DL DCI fields are needed to be re-interpreted are defined as a default rule in the specification (e.g., 2 bits of ARI will be re-interpreted). It is noted that in other implementations, the base station may configure how many bits and which DL DCI fields are needed to be re-interpreted via RRC signaling. When the base station finds that the quality of UL signals becomes worse (e.g., lower than a predefined threshold), the base station may indicate to the UE to use the SUL component carrier for UL transmission. However, the UE may not have any PUCCH configuration of the SUL component carrier. Hence, the base station may use the DL DCI to indicate resource for UCI transmission after the RRC reconfiguration is complete.

The DL DCI may contain a bit to explicitly indicate which carrier is to be used for UL transmission (e.g., "0" indicating to transmit the HARQ-ACK in the UL component carrier and "1" indicating to transmit the HARQ-ACK in the SUL component carrier). FIG. 6 shows an example of a DL DCI field for indicating which of the UL or SUL component carrier is to be used for UL transmission.

Figure 8:
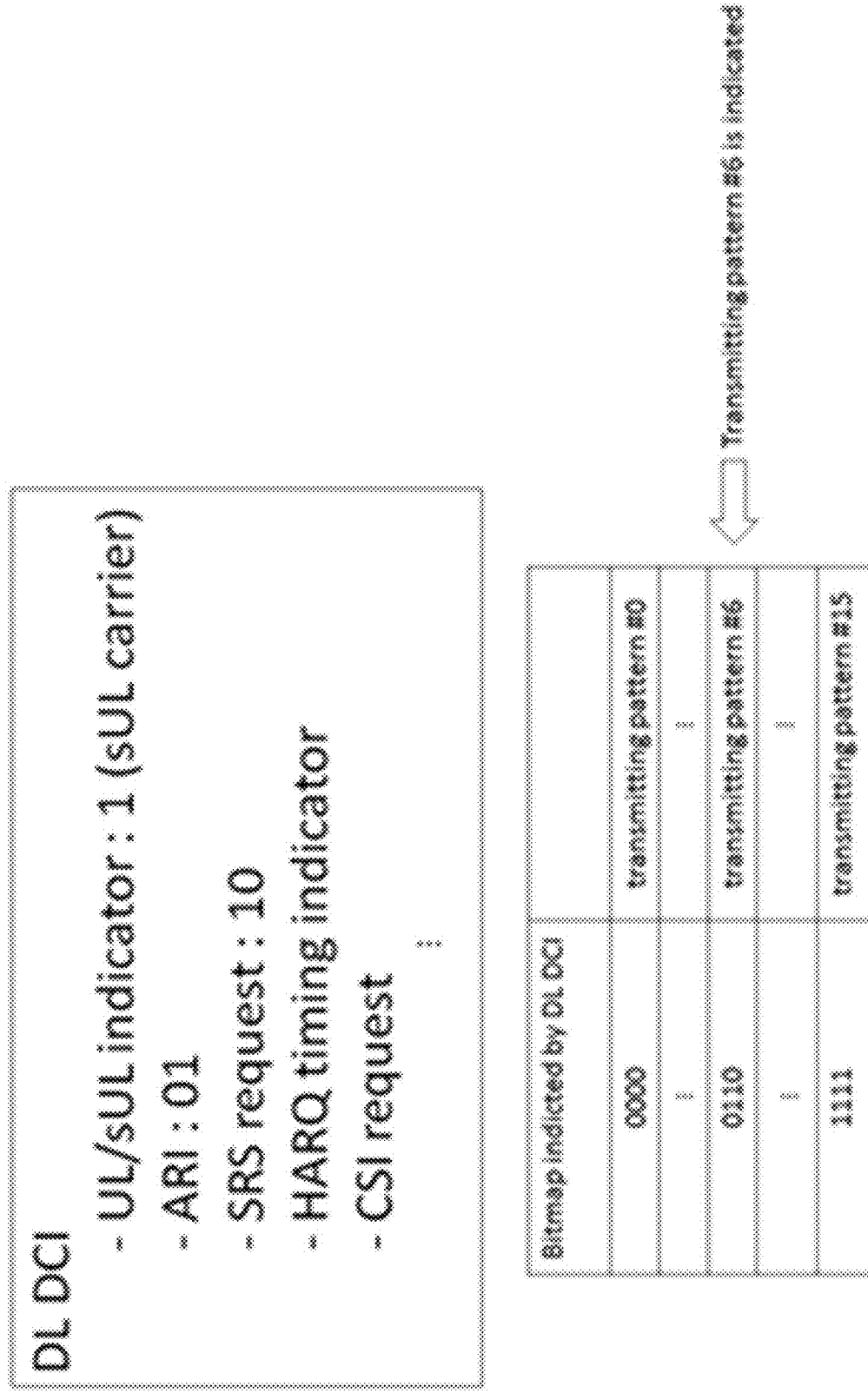
FIG. 8 is a diagram illustrating an example of a relationship ARI field, SRS request field and transmitting pattern, in accordance with an example implementation of the present application.

If the DL DCI indicates that UL transmission is in the SUL component carrier, and the UE is only configured with PUCCH resource in the UL component carrier by the base station, then the UE may re-interpret the SRS request field and ARI field based on default rules in the specification (e.g., 4 bits of the SRS request and ARI field may be re-interpreted). Thus, the 4 bits may be used for aperiodic resource allocation of a UL transmission for UCI. FIG. 8 shows an exemplary relationship between a re-interpreted DL DCI field and a transmitting pattern, according to an implementation of the present application.

After the UE obtains the transmitting pattern, the UE may send uplink control information (e.g., HARQ-ACK) in the resource indicated by the transmitting pattern.

Implementation 1-3: SRS Request, HARQ Timing Indicator and ARI for Aperiodic Resource Allocation of UL Transmission for UCI In implementation 1-3, a base station may configure a cell that is capable of UL transmission using an SUL component carrier via ServingCellConfig and/or ServingCellConfigCommon of RRC signaling. If a UE establishes a link with this cell, the UE may receive a PUSCH configuration and a PUCCH configuration via ServingCellConfig of RRC signaling. The PUSCH configuration may contain both PUSCH settings of an SUL component carrier and a UL component carrier, whereas the PUCCH configuration may contain one setting of either a UL component carrier or an SUL component carrier, depending on the base station. The examples of RRC signaling of PUCCH and PUSCH configurations for UL component carrier and SUL component carrier are shown in FIGS. 5(a), 5(b), and 5(c). It should be noted that the order of the PUSCH configuration in the RRC signaling may correspond to the PUSCH setting of the UL component carrier or SUL component carrier. For example, the first PUSCH configuration is for the UL component carrier and the second PUSCH configuration is for the SUL component carrier. In another example, when there is only one PUSCH configuration, the PUSCH configuration may be in the same UL or SUL component carrier as the PUCCH configured by the base station.

Next, the base station may configure PUCCH resource in the UL component carrier for the UE when the channel quality is good enough for UL transmission in the UL component carrier. Meanwhile, the base station may configure for the UE a table of time and frequency transmitting pattern for resource allocation of an aperiodic UL transmission for UCI. It is noted that the transmitting pattern configuration is contained in the PUSCH configuration of the SUL component carrier. In the present implementation, the number of bits for transmitting pattern may be 2, and the number of bits and which DL DCI fields are needed to be re-interpreted are defined as a default rule in the specification (e.g., 2 bits of ARI will be re-interpreted). It is noted that in other implementations, the base station may configure how many bits and which DL DCI fields are needed to be re-interpreted via RRC signaling. When the base station finds that the quality of UL signals becomes worse (e.g., lower than a predefined threshold), the base station may indicate to the UE to use the SUL component carrier for UL transmission. However, the UE may not have any PUCCH configuration of the SUL component carrier. Hence, the base station may use the DL DCI to indicate resource for UCI transmission after the RRC reconfiguration is complete.

The DL DCI may contain a bit to explicitly indicate which carrier is to be used for UL transmission (e.g., "0" indicating to transmit the HARQ-ACK in the UL component carrier and "1" indicating to transmit the HARQ-ACK in the SUL component carrier). FIG. 6 shows an example of a DL DCI field for indicating which of the UL or SUL component carrier is to be used for UL transmission.

Figure 9:
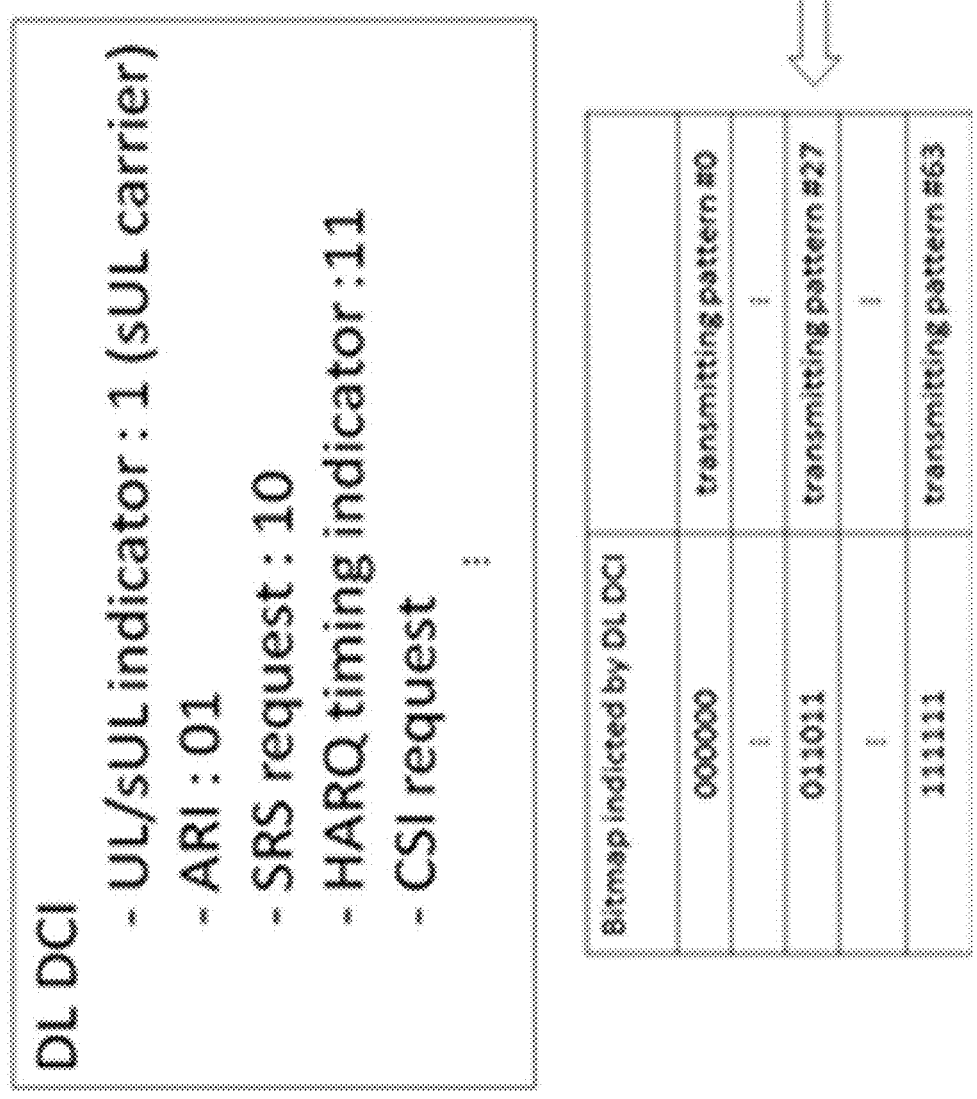
FIG. 9 is a diagram illustrating an example of a relationship between ARI field, HARQ timing index, SRS request field and transmitting pattern, in accordance with an example implementation of the present application.

If the DL DCI indicates that UL transmission is in the SUL component carrier, and the UE is only configured with PUCCH resource in the UL component carrier by the base station, then the UE may re-interpret the SRS request field, HARQ timing index and ARI field based on default rules in the specification (e.g., 6 bits of the SRS request, HARQ timing indicator and ARI may be re-interpreted). Thus, the 6 bits may be used for aperiodic resource allocation of a UL transmission for UCI. FIG. 9 shows an exemplary relationship between a re-interpreted DL DCI field and a transmitting pattern, according to an implementation of the present application. If the transmitting pattern does not contain the slot offset for the UL transmission, the UE may assume that the slot offset for the UL transmission is defined by a default value in the specification such as 4 slots.

After the UE obtains the transmitting pattern, the UE may send uplink control information (e.g., HARQ-ACK) in the resource indicated by the transmitting pattern.

Implementation 1-4: SRS Request, HARQ Timing Indicator, CSI Request and ARI for Aperiodic Resource Allocation of UL Transmission for UCI In implementation 1-4, a base station may configure a cell, that is capable of UL transmission using an SUL component carrier via ServingCellConfig and/or ServingCellConfigCommon of RRC signaling. If a UE establishes a link with this cell, the UE may receive a PUSCH configuration and a PUCCH configuration via ServingCellConfig of RRC signaling. The PUSCH configuration may contain both PUSCH settings of an SUL component carrier and a UL component carrier, whereas the PUCCH configuration may contain one setting of either a UL component carrier or an SUL component carrier, depending on the base station. The examples of RRC signaling of PUCCH and PUSCH configurations for UL component carrier and SUL component carrier are shown in FIGS. 5(a), 5(b), and 5(c). It should be noted that the order of the PUSCH configuration in the RRC signaling may correspond to the PUSCH setting of the UL component carrier or SUL component carrier. For example, the first PUSCH configuration is for the UL component carrier and the second PUSCH configuration is for the SUL component carrier. In another example, when there is only one PUSCH configuration, the PUSCH configuration may be in the same UL or SUL component carrier as the PUCCH configured by the base station.

Next, the base station may configure PUCCH resource in the UL component carrier for the UE when the channel quality is good enough for UL transmission in the UL component carrier. Meanwhile, the base station may configure for the UE a table of time and frequency transmitting pattern for resource allocation of an aperiodic UL transmission for UCI. It is noted that the transmitting pattern configuration is contained in the PUSCH configuration of the SUL component carrier. In the present implementation, the number of bits for transmitting pattern may be 2, and the number of bits and which DL DCI fields are needed to be re-interpreted are defined as a default rule in the specification (e.g., 2 bits of ARI will be re-interpreted). It is noted that in other implementations, the base station may configure how many bits and which DL DCI fields are needed to be re-interpreted via RRC signaling. When the base station finds that the quality of UL signals becomes worse (e.g., lower than a predefined threshold), the base station may indicate to the UE to use the SUL component carrier for UL transmission. However, the UE may not have any PUCCH configuration of the SUL component carrier. Hence, the base station may use the DL DCI to indicate resource for UCI transmission after the RRC reconfiguration is complete.

The DL DCI may contain a bit to explicitly indicate which carrier is to be used for UL transmission (e.g., "0" indicating to transmit the HARQ-ACK in the UL component carrier and "1" indicating to transmit the HARQ-ACK in the SUL component carrier). FIG. 6 shows an example of a DL DCI field for indicating which of the UL or SUL component carrier is to be used for UL transmission.

If the DL DCI indicates that UL transmission is in the SUL component carrier, and the UE is only configured with PUCCH resource in the UL component carrier by the base station, then the UE may re-interpret the SRS request field, HARQ timing index, CSI request field and ARI field based on default rules in the specification (e.g., 12 bits of SRS request, HARQ timing indicator, CSI request and ARI may be re-interpreted). Thus, a maximum of 12 bits may be used for aperiodic resource allocation of a UL transmission for UCI depending on how many bits for CSI request field are required by the CSI report configuration.

Figure 10A:
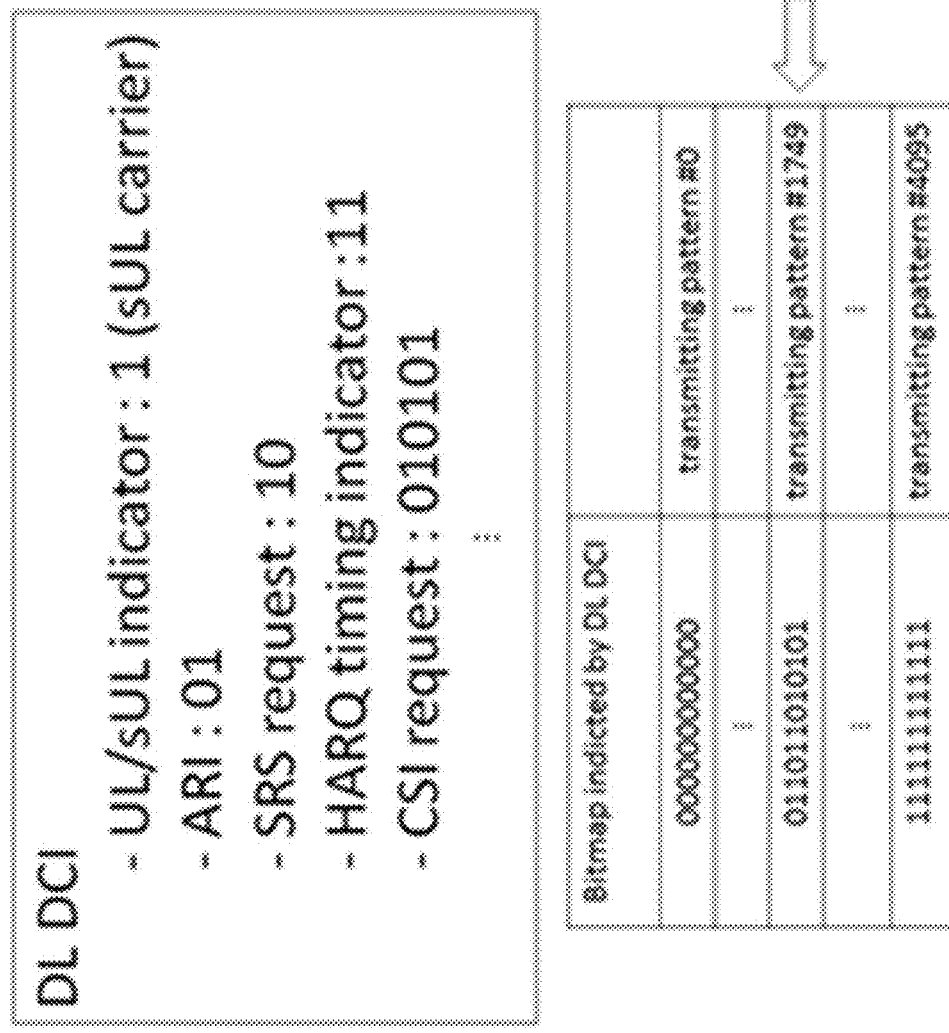
FIG. 10(a) is a diagram illustrating an example of a relationship between ARI field, HARQ timing index, CSI request field, SRS request field and transmitting pattern, in accordance with an example implementation of the present application.

FIG. 10(a) shows an exemplary relationship between a re-interpreted DL DCI field and a transmitting pattern, according to an implementation of the present application. If the transmitting pattern does not contain the slot offset for the UL transmission, the UE may assume that the slot offset for the UL transmission is defined by a default value in the specification such as 4 slots. Furthermore, if the number of required bits for frequency location is less than or equal to the total bits obtained from the re-interpreted DL DCI field, the transmitting pattern may contain frequency domain resource assignment of a starting PRB index. For example, if the UL bandwidth for the SUL component carrier is 100 PRBs (e.g., 7 bits is needed for indicating a starting PRB index) and the total number of bits obtained from re-interpretation is 12 bits, the remaining 5 bits is for indicating the transmitting pattern configured by the base station, as shown in FIG. 10(b).

After the UE obtains the transmitting pattern, the UE may send uplink control information (e.g., HARQ-ACK) in the resource indicated by the transmitting pattern.

Implementation 1-5: SRS Request, HARQ Timing Indicator, CSI Request, ARI and CCE index for Aperiodic Resource Allocation of UL Transmission for UCI In implementation 1-5, a base station may configure a cell, that is capable of UL transmission using an SUL component carrier via ServingCellConfig and/or Serving-CellConfigCommon of RRC signaling. If a UE establishes a link with this cell, the UE may receive a PUSCH configuration and a PUCCH configuration via ServingCellConfig of RRC signaling. The PUSCH configuration may contain both PUSCH settings of an SUL component carrier and a UL component carrier, whereas the PUCCH configuration may contain one setting of either a UL component carrier or an SUL component carrier, depending on the base station. The examples of RRC signaling of PUCCH and PUSCH configurations for UL component carrier and SUL component carrier are shown in FIGS. 5(a), 5(b), and 5(c). It should be noted that the order of the PUSCH configuration in the RRC signaling may correspond to the PUSCH setting of the UL component carrier or SUL component carrier. For example, the first PUSCH configuration is for the UL component carrier and the second PUSCH configuration is for the SUL component carrier. In another example, when there is only one PUSCH configuration, the PUSCH configuration may be in the same UL or SUL component carrier as the PUCCH configured by the base station.

Next, the base station may configure PUCCH resource in the UL component carrier for the UE when the channel quality is good enough for UL transmission in the UL component carrier. Meanwhile, the base station may configure for the UE a table of time and frequency transmitting pattern for resource allocation of an aperiodic UL transmission for UCI. It is noted that the transmitting pattern configuration is contained in the PUSCH configuration of the SUL component carrier. In the present implementation, the number of bits for transmitting pattern may be 2, and the number of bits and which DL DCI fields are needed to be re-interpreted are defined as a default rule in the specification (e.g., 2 bits of ARI will be re-interpreted). It is noted that in other implementations, the base station may configure how many bits and which DL DCI fields are needed to be re-interpreted via RRC signaling. When the base station finds that the quality of UL signals becomes worse (e.g., lower than a predefined threshold), the base station may indicate to the UE to use the SUL component carrier for UL transmission. However, the UE may not have any PUCCH configuration of the SUL component carrier. Hence, the base station may use the DL DCI to indicate resource for UCI transmission after the RRC reconfiguration is complete.

The DL DCI may contain a bit to explicitly indicate which carrier is to be used for UL transmission (e.g., "0" indicating to transmit the HARQ-ACK in the UL component carrier and "1" indicating to transmit the HARQ-ACK in the SUL component carrier). FIG. 6 shows an example of a DL DCI field for indicating which of the UL or SUL component carrier is to be used for UL transmission.

Figure 11B:
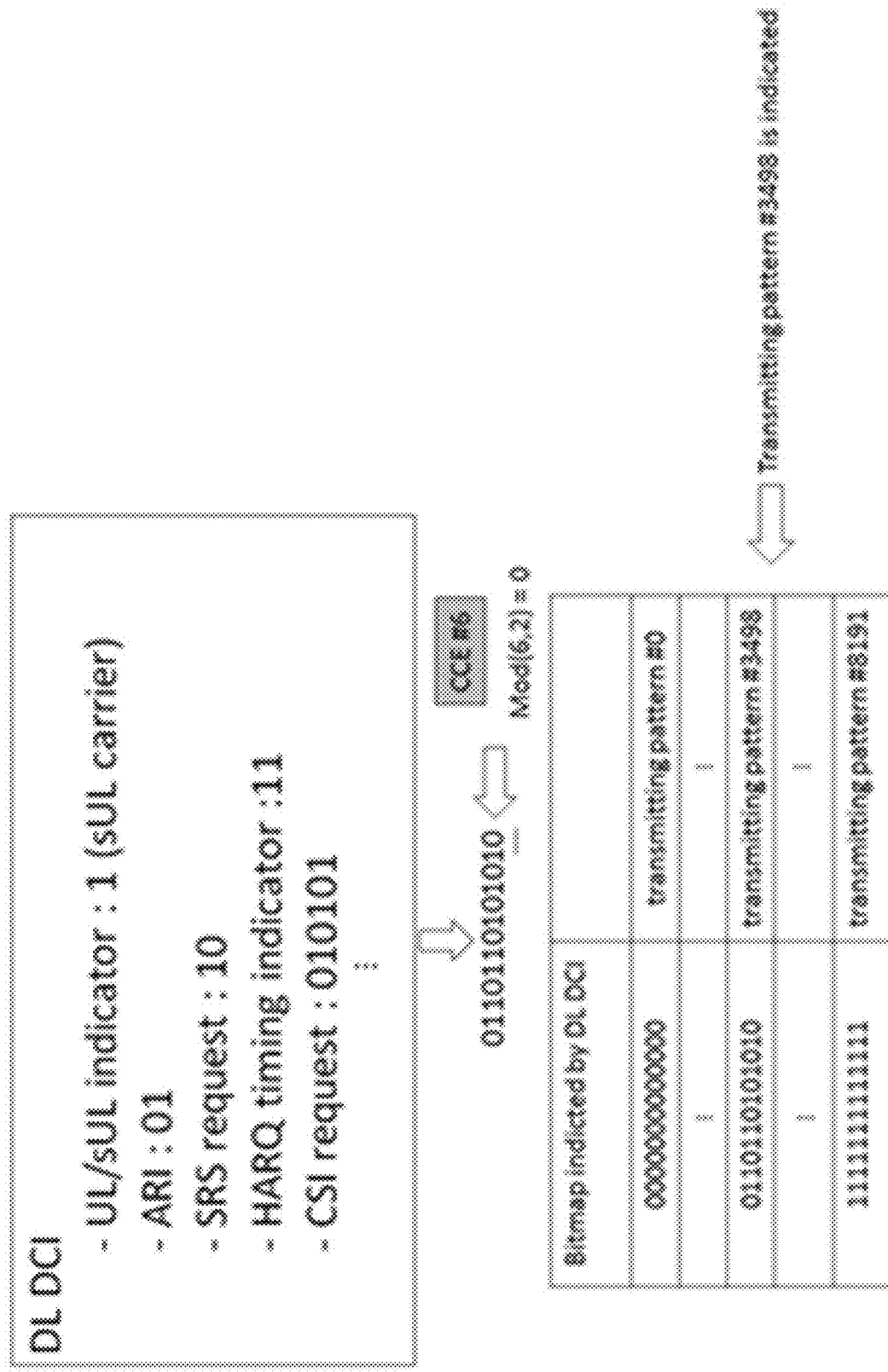
FIG. 11(b) is a diagram illustrating an example of a relationship between ARI field, HARQ timing index, CSI request field, SRS request field, additional bit from CCE index and transmitting pattern, in accordance with an example implementation of the present application.
Figure 11C:
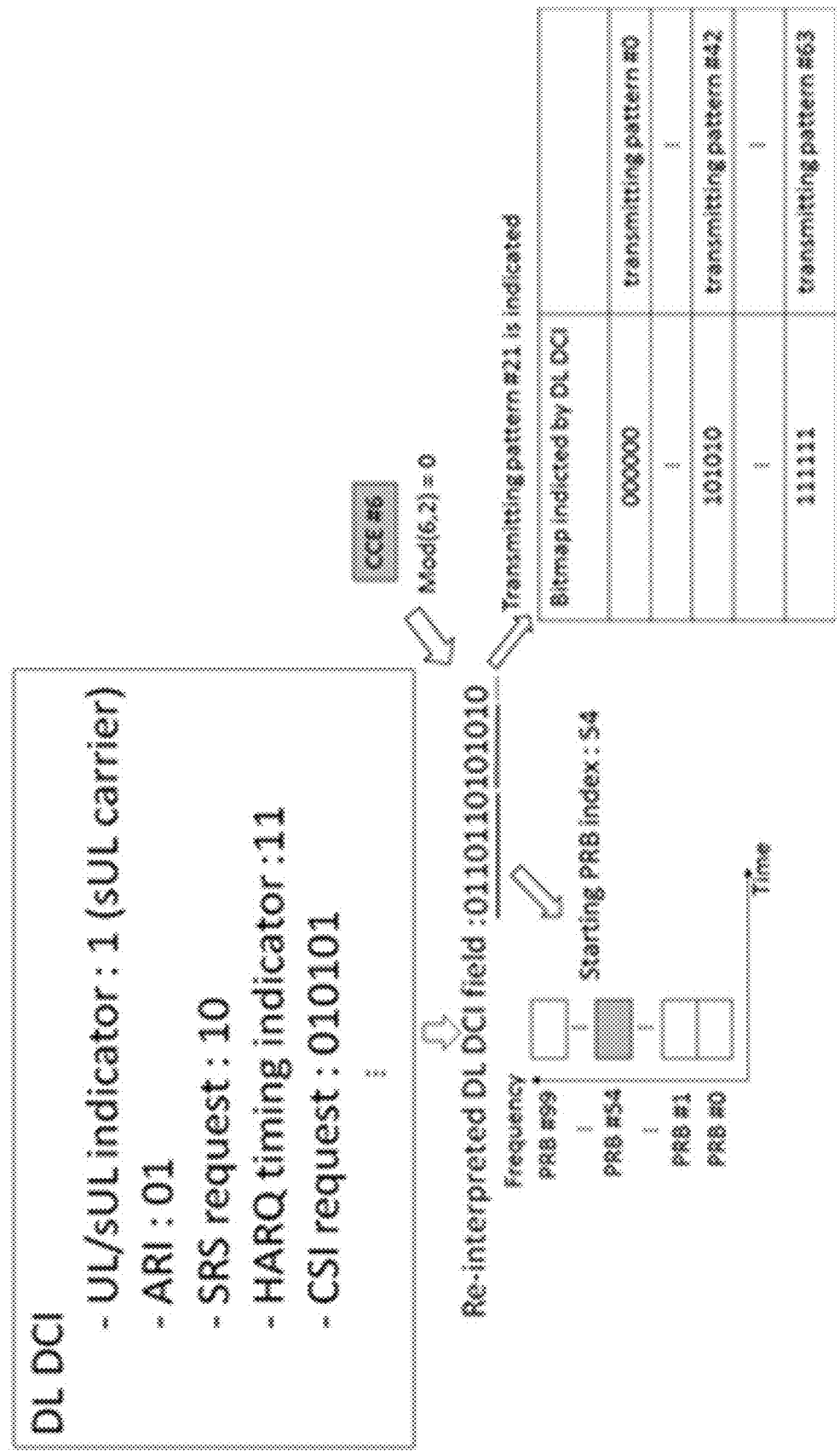
FIG. 11(c) is a diagram illustrating an example of a relationship between ARI field, HARQ timing index, CSI request field, SRS request field, additional bit from CCE index and transmitting pattern with explicit frequency domain resource assignment, in accordance with an example implementation of the present application.

If the DL DCI indicates that UL transmission is in the SUL component carrier, and the UE is only configured with PUCCH resource in the UL component carrier by the base station, then the UE may re-interpret the SRS request field, HARQ timing index, CSI request field, ARI field, and CCE index based on default rules in the specification (e.g., 12 bits of SRS request, HARQ timing indicator, CSI request, ARI and CCE index may be re-interpreted). Moreover, the CCE index of the DL DCI may also be used for indicating transmitting pattern. For example, the lowest CCE index used for the DL DCI may be used to indicate the transmitting pattern. In implementation 1-5, the lowest CCE index modules 2 can be used for indicating the transmitting pattern. Therefore, Thus, a maximum of 12 bits from the DL DCI field may be used for aperiodic resource allocation of a UL transmission for UCI depending on how many bits for CSI request field are required by the CSI report configuration in addition to 1 bit from the CCE index. The example relationship between a re-interpreted DL DCI field, CCE index and transmitting pattern is shown in FIGS. 11(a), 11(b) and 11(c). For example, if the UE decodes the DL DCI successfully in searching space #1 as shown in FIG. 11(a), the UE may add "0" as an LSB bit since the index of the first CCE of this searching space is 6, and 6 module 2 is 0. If the transmitting pattern does not contain a slot offset for the UL transmission, the UE may assume that the slot offset for the UL transmission is defined by a default value in the specification such as 4 slots.

After the UE obtains the transmitting pattern, the UE may send uplink control information (e.g., HARQ-ACK) in the resource indicated by the transmitting pattern.

Implementation 2: SRS Transmission for HARQ-ACK Indication

In implementation 2, a base station may configure a cell, that is capable of UL transmission using an SUL component carrier via ServingCellConfig and/or ServingCellConfigCommon of RRC signaling. If a UE establishes a link with this cell, the UE may receive a PUSCH configuration and a PUCCH configuration via ServingCellConfig of RRC signaling. The PUSCH configuration may contain both PUSCH settings of an SUL component carrier and a UL component carrier, whereas the PUCCH configuration may contain one setting of either a UL component carrier or an SUL component carrier, depending on the base station. The examples of RRC signaling of PUCCH and PUSCH configurations for UL component carrier and SUL component carrier are shown in FIGS. 5(a), 5(b), and 5(c). It should be noted that the order of the PUSCH configuration in the RRC signaling may correspond to the PUSCH setting of the UL component carrier or SUL component carrier. For example, the first PUSCH configuration is for the UL component carrier and the second PUSCH configuration is for the SUL component carrier. In another example, when there is only one PUSCH configuration, the PUSCH configuration may be in the same UL or SUL component carrier as the PUCCH configured by the base station.

Next, the base station may configure a cell that is capable of UL transmission using an SUL component carrier via ServingCellConfig and/or ServingCellConfigCommon of RRC signaling. If a UE establishes a link with this cell, the UE may receive an SRS configuration via ServingCellConfig of RRC signaling. The SRS configuration may contain a SRS resource set configuration of an SUL component carrier and a UL component carrier, and each SRS resource set may contain one or more SRS resources. The examples of RRC signaling of SRS configurations for UL component carrier and SUL component carrier are shown in FIG. 12. It should be noted that the order of SRS configuration in the RRC signaling may correspond to the SRS setting of the UL component carrier or SUL component carrier. For example, the first SRS configuration is for the UL component carrier and the second SRS configuration is for the SUL component carrier. The SRS request field in the DL DCI may trigger an aperiodic transmission of one or more SRS resource sets, and a table of the SRS request field and triggered SRS resource set is shown in FIG. 13.

The base station may configure PUCCH resource in the UL component carrier for the UE when the channel quality is good enough for UL transmission in the UL component carrier.

When the base station finds that the quality of UL signals becomes worse (e.g., lower than a predefined threshold), the base station may indicate to the UE to use the SUL component carrier for UL transmission. However, the UE may not have any PUCCH configuration of the SUL component carrier. Hence, the base station may use the DL DCI to indicate resource for UCI transmission after the RRC reconfiguration is complete.

The DL DCI may contain a bit to explicitly indicate which carrier is to be used for UL transmission (e.g., "0" indicating to transmit the HARQ-ACK in the UL component carrier and "1" indicating to transmit the HARQ-ACK in the SUL component carrier). FIG. 6 shows an example of a DL DCI field for indicating which of the UL or SUL component carrier is to be used for UL transmission.

If the DL DCI indicates that UL transmission is in the SUL component carrier, and the time domain resource of the SRS transmission overlaps with the time domain resource of the HARQ-ACK transmission, while the UE is only configured with a PUCCH in the UL component carrier, the UE may trigger a mechanism that utilizes SRS transmission as a HARQ-ACK transmission. If the response of the DL HARQ is an ACK, the UE may transmit the SRS in the SUL component carrier based on the SRS configuration of the SUL component carrier without transmitting a HARQ-ACK in the UL component carrier as shown in FIG. 14. On the other hand, if the response of the DL HARQ is a NACK, the UE may transmit nothing in both the UL component carrier and SUL component carrier.

FIG. 15 illustrates a flowchart of a method by a UE for transmitting an aperiodic UL transmission for UCI, in accordance with an example implementation of the present application. As shown in FIG. 15, flowchart 1500 includes actions 1580 and 1582. In flowchart 1500, action 1580 may include receiving, by the UE, downlink control information (DCI) for a downlink (DL) scheduling assignment (DL-DCI), the DL-DCI indicating a first uplink (UL) carrier associated with a Physical Uplink Control Channel (PUCCH) resource configuration for transmitting an aperiodic UL transmission for uplink control information (UCI). Action 1582 may include transmitting, by the UE, the aperiodic UL transmission for UCI in a second UL carrier without a PUCCH resource configuration. The UE determines a resource allocation of the second UL carrier based on the DL-DCI. For example, the DL-DCI may include at least one of: a UL/supplementary UL (SUL) carrier indicator, a Hybrid Automatic Repeat reQuest (HARQ)-ACK resource indicator (ARI), a sounding reference signal (SRS) request field; a HARQ timing indicator, a channel station information (CSI) request, or a control channel element (CCE) index.

Figure 16:
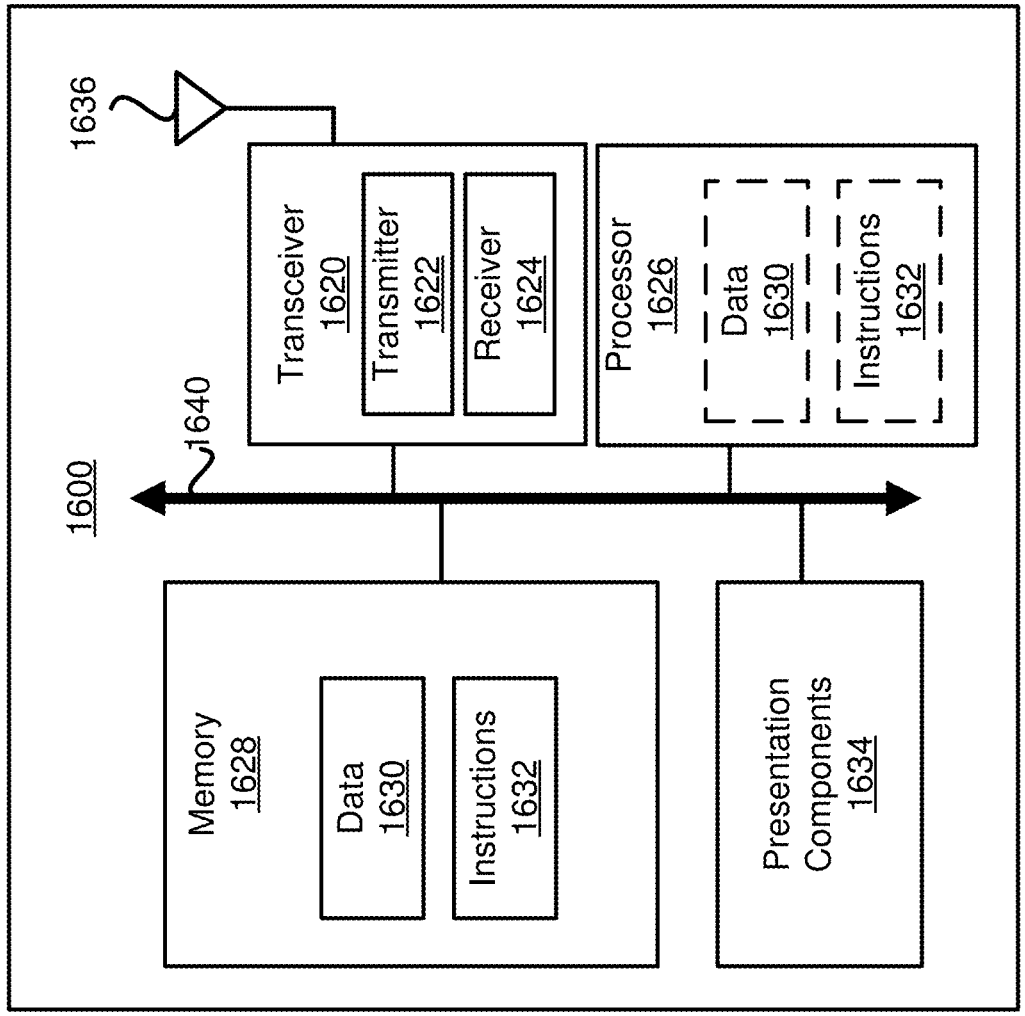
FIG. 16 illustrates a block diagram of a node for wireless communication, in accordance with various aspects of the present application.

FIG. 16 illustrates a block diagram of a node for wireless communication, in accordance with various aspects of the present application. As shown in FIG. 16, node 1600 may include transceiver 1620, processor 1626, memory 1628, one or more presentation components 1634, and at least one antenna 1636. Node 1600 may also include a Radio Frequency (RF) spectrum band module, a base station communications module, a network communications module, and a system communications management module, input/output (I/O) ports, I/O components, and power supply (not explicitly shown in FIG. 16). Each of these components may be in communication with each other, directly or indirectly, over one or more buses 1640.

Transceiver 1620 having transmitter 1622 and receiver 1624 may be configured to transmit and/or receive time and/or frequency resource partitioning information. In some implementations, transceiver 1620 may be configured to transmit in different types of subframes and slots including, but not limited to, usable, non-usable and flexibly usable subframes and slot formats. Transceiver 1620 may be configured to receive data and control channels.

Node 1600 may include a variety of computer-readable media. Computer-readable media can be any available media that can be accessed by node 1600 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1628 may include computer-storage media in the form of volatile and/or non-volatile memory. Memory 1628 may be removable, non-removable, or a combination thereof. Exemplary memory includes solid-state memory, hard drives, optical-disc drives, and etc. As illustrated in FIG. 16, memory 1628 may store computer-readable, computer-executable instructions 1632 (e.g., software codes) that are configured to, when executed, cause processor 1626 to perform various functions described herein, for example, with reference to FIGS. 1 through 15. Alternatively, instructions 1632 may not be directly executable by processor 1626 but be configured to cause node 1600 (e.g., when compiled and executed) to perform various functions described herein.

Processor 1626 may include an intelligent hardware device, e.g., a central processing unit (CPU), a microcontroller, an ASIC, and etc. Processor 1626 may include memory. Processor 1626 may process data 1630 and instructions 1632 received from memory 1628, and information through transceiver 1620, the base band communications module, and/or the network communications module. Processor 1626 may also process information to be sent to transceiver 1620 for transmission through antenna 1636, to the network communications module for transmission to a core network.

One or more presentation components 1634 presents data indications to a person or other device. Exemplary one or more presentation components 1634 include a display device, speaker, printing component, vibrating component, and etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a user equipment (UE), the method comprising:
   receiving, by the UE, downlink control information (DCI) for a downlink (DL) scheduling assignment (DL-DCI), the DL-DCI indicating a first uplink (UL) carrier associated with a Physical Uplink Control Channel (PUCCH) resource configuration for transmitting an aperiodic UL transmission for uplink control information (UCI);
   transmitting, by the UE, the aperiodic UL transmission for UCI in a second UL carrier without a PUCCH resource configuration;
   wherein the UE determines a resource allocation of the second UL carrier based on the DL-DCI.

2. The method of claim 1, wherein the DL-DCI includes at least one of:
   a UL/supplementary UL (SUL) carrier indicator;
   a Hybrid Automatic Repeat reQuest (HARQ)-ACK resource indicator (ARI);
   a sounding reference signal (SRS) request field;
   a HARQ timing indicator; and
   a channel station information (CSI) request.

3. The method of claim 2, wherein the UL/SUL carrier indicator includes at least one bit for indicating on which one of a UL carrier and a SUL carrier the UE is to perform the aperiodic UL transmission for UCI.

4. The method of claim 2, wherein the ARI indicates one of a plurality of PUCCH resource configurations for transmitting the aperiodic UL transmission for UCI.

5. The method of claim 4, wherein the DL-DCI further includes a control channel element (CCE) index, together with the ARI, for indicating the one of the plurality of PUCCH resource configurations for transmitting the aperiodic UL transmission for UCI.

6. The method of claim 2, wherein, when the UL/SUL carrier indicator indicates using an SUL carrier for transmitting the aperiodic UL transmission for UCI, and the SUL is not configured with a PUCCH resource, the UE is configured to re-interpret the DL-DCI to determine a transmitting pattern for the aperiodic UL transmission for UCI.

7. The method of claim 1, wherein the aperiodic UL transmission for UCI includes a HARQ message.

8. The method of claim 1, wherein the PUCCH resource configuration is configured through radio resource control (RRC) signaling.

9. A user equipment (UE) comprising:
   one or more non-transitory computer-readable media having computer-executable instructions embodied thereon;
   at least one processor coupled to the one or more non-transitory computer-readable media, and configured to execute the computer-executable instructions to:
   receive downlink control information (DCI) for a downlink (DL) scheduling assignment (DL-DCI), the DL-DCI indicating a first uplink (UL) carrier associated with a Physical Uplink Control Channel (PUCCH) resource configuration for transmitting an aperiodic UL transmission for uplink control information (UCI);
   transmit the aperiodic UL transmission for UCI in a second UL carrier without a PUCCH resource configuration;
   wherein the UE determines a resource allocation of the second UL carrier based on the DL-DCI.

10. The UE of claim 9, wherein the DL-DCI includes at least one of:
    a UL/supplementary UL (SUL) carrier indicator;
    a Hybrid Automatic Repeat reQuest (HARQ)-ACK resource indicator (ARI);
    a sounding reference signal (SRS) request field;
    a HARQ timing indicator; and
    a channel station information (CSI) request.

11. The UE of claim 10, wherein the UL/SUL carrier indicator indicates which one of a UL carrier or a SUL carrier is for transmitting the aperiodic UL transmission for UCI.

12. The UE of claim 10, wherein the ARI indicates one of a plurality of PUCCH resource configurations for transmitting the aperiodic UL transmission for UCI.

13. The UE of claim 12, wherein the DL-DCI further includes a control channel element (CCE) index, together with the ARI, for indicating the one of the plurality of PUCCH resource configurations for transmitting the aperiodic UL transmission for UCI.

14. The UE of claim 10, wherein, when the UL/SUL carrier indicator indicates using an SUL carrier for transmitting the aperiodic UL transmission for UCI, and the SUL is not configured with a PUCCH resource, the UE is configured to re-interpret the DL-DCI to determine a transmitting pattern for the aperiodic UL transmission for UCI.

15. The UE of claim 9, wherein the aperiodic UL transmission for UCI includes a HARQ message.

16. The UE of claim 9, wherein the PUCCH resource configuration is configured through radio resource control (RRC) signaling.

* * * * *